United States Patent [19]

Williams et al.

[11] Patent Number: 4,639,013
[45] Date of Patent: Jan. 27, 1987

[54] VEHICLE SUSPENSION ARRANGEMENTS

[75] Inventors: David A. Williams, Cranfield; Peter G. Wright, Norwich, both of England

[73] Assignee: Group Lotus Cap Companies PLC, Norwich, England

[21] Appl. No.: 704,912

[22] Filed: Feb. 21, 1985

[30] Foreign Application Priority Data

Feb. 8, 1985 [GB] United Kingdom ............... 8503290

[51] Int. Cl.⁴ ............................................. B60G 17/00
[52] U.S. Cl. .................................. 280/707; 180/41; 267/64.16; 280/714
[58] Field of Search ............ 280/707, 714, 6 R, 6 H, 280/6.1, DIG. 1, 708; 180/41; 267/64.16, 64.28

[56] References Cited

U.S. PATENT DOCUMENTS 3,847,410 11/1974 Keijzer et al. ................. 280/6 H
4,468,739 8/1984 Woods et al. .................. 280/707

Primary Examiner—John J. Love
Assistant Examiner—Charles R. Watts
Attorney, Agent, or Firm—Young & Thompson

[57] ABSTRACT

An active vehicle suspension system has a suspension device with a variable offset gas spring and a double acting hydraulic actuator acting in parallel. Load changes experienced by the device are sensed electrically, or electrically and hydraulically, so as to effect appropriate response of the device by adjustment of the actuator pending change of the offset of the gas spring, so as to reduce energy requirements.

19 Claims, 4 Drawing Figures

VEHICLE SUSPENSION ARRANGEMENTS

FIELD OF THE INVENTION

The invention relates to vehicle suspension arrangements, in particular to active vehicle suspension arrangements in which the road wheel position relative to the vehicle is adjusted in response to sensed conditions.

BACKGROUND OF THE INVENTION

In U.S. Patent Application Ser. No. 653,216 filed on Sept. 20 1984 by the present inventors and commonly owned herewith, there is described a vehicle suspension system comprising wheel suspension devices, the displacement of which can be varied, and means responsive to the loading of the suspension devices to feed back to the devices electric signals effecting a predetermined displacement. In European Patent Application No. 84 307 288.5 and in International Patent Application PCT/GB84/00358, both of which claim priority from UK Patent Application 83 28 373, there is disclosed a wheel suspension device for use in such a system and comprising an hydraulic actuator of which the piston position is adjustable in response to forces acting thereon and/or to a selected control input, and a load bearing strut responsive to the actuator piston experience to minimize the load carried by the actuator.

The system of U.S. Patent Application Ser. No. 653,216 offers substantial advantages over previous passive suspension systems, for example self-levelling of the vehicle under varying loads, due either to payload changes or to externally applied loads, can be effected. The system moreover has the ability to stabilize the vehicle under inertial loads such as braking, accelerating and cornering, so as to prevent changes in attitude of the vehicle. Additionally, the damping characteristics can be adaptively varied according to dynamic requirements of both the sprung and unsprung masses, to minimize transmitted accelerations, while maximizing the grip of the wheel on the road under varying conditions. Also, the system can be adapted to receive a selected energy input to further modify the damping characteristics.

The full advantages of such an active vehicle suspension system are obtained only by the input of considerable energy, and it is accordingly an object of the present invention to provide an active vehicle suspension system which reduces this energy demand under a wide range of conditions, for a given set of characteristics.

SUMMARY OF THE INVENTION

The invention accordingly provides a vehicle suspension system comprising a wheel suspension device, the wheel suspension device having actuator means, gas spring means controllable to provide a selectively variable offset in parallel with the actuator means, and control means responsive to load changes experienced by the device to accommodate such changes by adjustment of the actuator means pending change of the offset of the gas spring.

The actuating means can comprise a double-acting hydraulic actuator connected to a source of pressure fluid through a servo-valve responsive to signals generated in response to the load experience of the device, in parallel with either a 2-port electrically controlled proportional valve or an asymmetrical flow restricting valve provided with blow-off valves, which could be included in the actuator piston.

The gas spring can comprise a selectively variable volume of fluid in the device either in contact with a body of gas also within the device or associated with an external hydraulic accumulator. The volume of the fluid body is adjustable by means of a 3-port valve which arranged to respond to the pressure difference across the actuator piston, sensed either electrically or hydraulically or to the load experienced by the device.

Under steady loads, the damping of the device is primarily controlled, passively or adaptively, by the valve in parallel with the servo-valve, which would be controlled to effect any change in damping characteristics called for externally of the device.

However embodied, the invention provides that the system energy demand derives only from the active component of the dynamic movement of the device and the flow through the actuator valving arrangement due to pressure differences across the actuator piston whilst the gas spring offset is being adjusted to bring this pressure difference to zero. Substantial reduction in energy demand is achieved over the demand in conventional systems where the demand is a function of the total motion of the suspension devices.

Figure 1A:
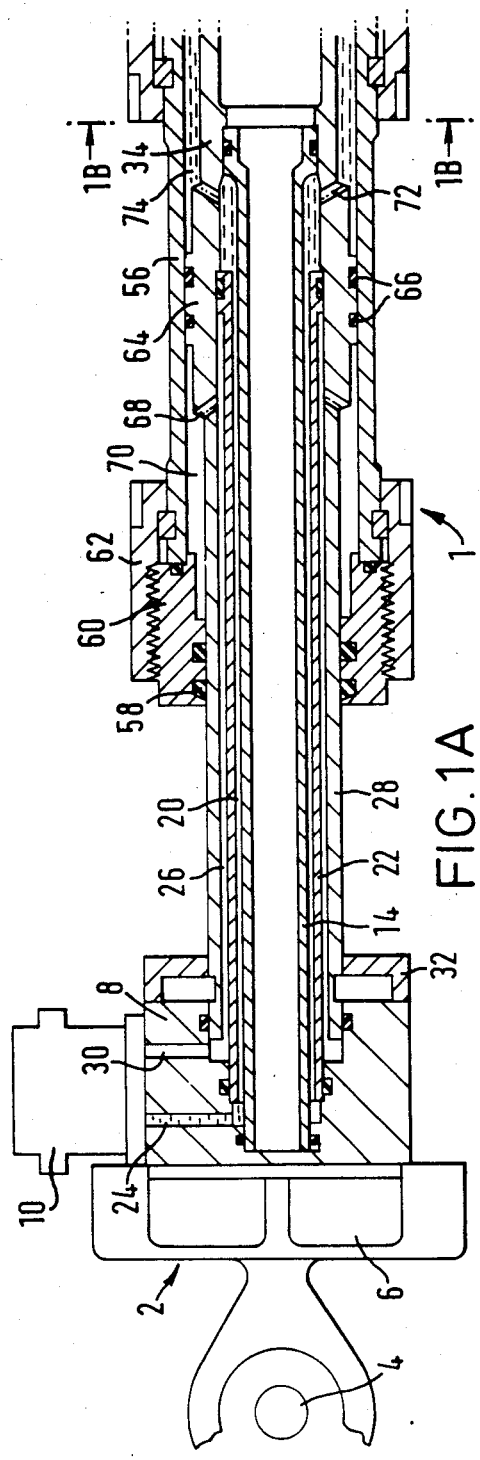
FIGS. 1A and 1B together are a sectional front view of a vehicle wheel suspension device for use in vehicle suspension systems embodying the invention, shown in an extended position.
Figure 1B:
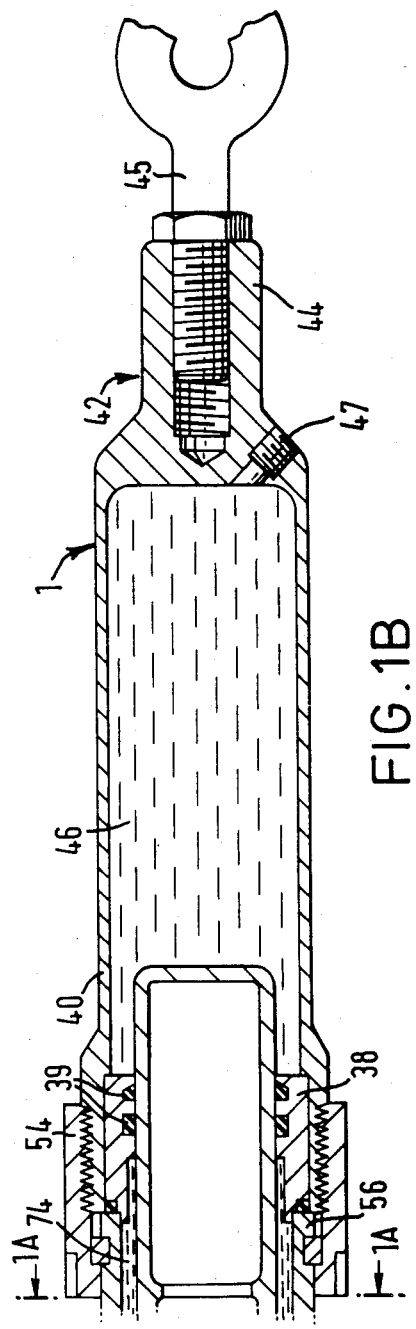
Figure 2:
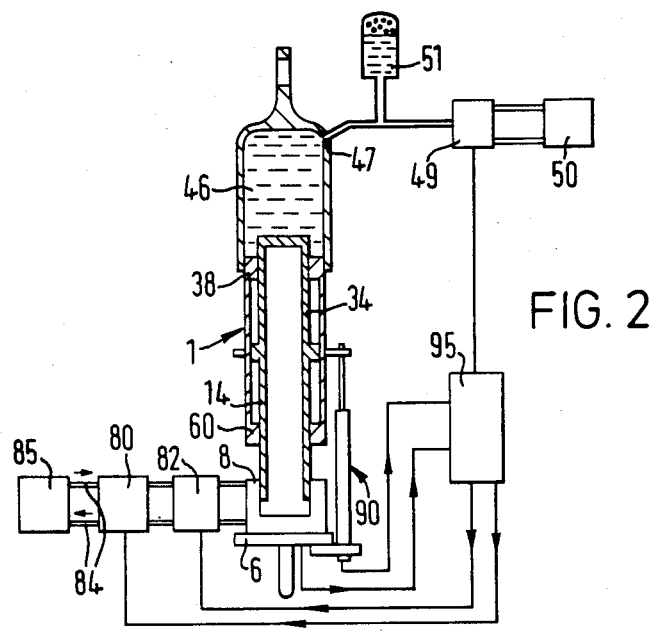
FIG. 2 schematically shows the suspension device of FIG. 1 incorporated in a first vehicle wheel suspension system in accordance with the invention.

The vehicle wheel suspension device 1 illustrated in FIGS. 1 and 2 comprises a lower end fitting 2 formed with a loop 4 for connection of the device to a vehicle axle assembly (not shown).

At its upper side, the fitting 2 has a recess accommodating a load cell 6 operative between the fitting and a head member 8. The head member 8 mounts a valve unit 10 and has a stepped recess formed in its upper side within which are received three spaced concentric tubes 14, 22, 28, each sealed to the head member by an external O-ring or like seal.

The space 20 between the inner tube 14 and the intermediate tube 22 communicates through a passage 24 in the head member 8 with the valve unit 10, and the outer annular space 26 between the intermediate tube 22 and the stainless steel outer tube 28 communicates with the valve unit 10 through a passage 30. The assembly comprising the tubes 14,22,28 is secured to the head member 8 by means of a steel split collar 32. At its upper end, the inner tube 14 is sealingly secured to an extension portion 34 of the outer tube 28, the upper end of which is closed.

A ring 38 makes a sliding seal to the exterior of the extension portion 34 by means of sealing rings 39 and is secured to the lower tubular end portion 40 of an upper end fitting 42. The fitting 42 is closed by a reduced diameter portion 44 at its upper end, the portion 44 being tapped to receive a threaded end element 45 for connection of the device to a vehicle chassis. The interior of the fitting forms a working chamber 46 to which fluid can be supplied under pressure through a port 47, connected through a 3-port valve 49 with a fluid pressure source 50 by way of an hydraulic accumulator 51.

An outer ring 54 is secured around the lower end of the end portion 40 by means of a screw threaded connection. Secured within the lower end of the ring 54 is a sleeve 56, the upper end of which abuts the end portion 40 and the ring 38. The sleeve 56 is thus a downward extension of the end fitting 42 and at its lower end it makes a sliding seal on the exterior of the outer tube 28 by means of sealing elements 58 held by an end ring 60 secured to the sleeve end by an outer ring 62.

The outer tube 28 has, below the extension tube 34, a larger diameter portion 64, which makes a sliding seal, with the sleeve 56 by means of sealing elements 66, and which functions as a piston. Ports 68 at the lower end of the portion 64 communicate the space 26, between the tubes 22 and 28, with the space 70 between the tube 28 and the sleeve 56.

Also, ports 72 at the upper end of the portion 64 communicate the space 20 between the tubes 14 and 22 with the space 74 between the extension tube 34 and the sleeve 56.

It will be evident from the foregoing description that the device 1 can function as a double acting hydraulic actuator. Pressure fluid introduced into the space 70 from the source 50 or other source by way of the valve unit 10, passage 30, annular space 26 and ports 68, will act on the end faces of the space 70 to shorten the device. Pressure fluid supplied to the space 74 through the valve 10, passage 24, annular space 20 and ports 72 will act within the space 74 to lengthen the device. It will also be evident that the volume of the body of hydraulic fluid in the working chamber 46 can be selectively adjusted to alter the load deflection characteristics of the device 1.

The condition of the device 1 is sensed not only by the load cell 6 but also by a linear variable displacement transformer 90, of which the stator portion is received in a housing secured to the fitting 2 and to the head member 8, and the movabale core or yoke is secured to the sleeve 56. The the transformer output is thus dependent on the length and length variations of the device 1 as represented by the position and movement of the piston portion 64 in the sleeve 56. The transformer 90 thus supplies signals indicative of at least one of the velocity, acceleration and position of the piston portion.

As indicated in FIG. 2, the valve unit 10 comprises a servo-valve 80 in parallel with a 2-port electrically controlled proportional valve 82 across flow and return lines 84 communicating with a fluid pressure source 85 which can but need not be a source separate from the source 50. The outputs of the load cell 6 and of the linear variable displacement transformer 90 are supplied to control circuitry 95 arranged to generate control signals which are supplied to the valves 80,82 and 49.

The control circuitry 95 is generally of the kind described in United States Patent Application Ser. No. 653 216, the contents of which are incorporated herein by reference. However, the control circuitry and also the characteristics of the valves of the system are so selected and arranged that during a steady load condition, in which the mean pressure difference across the piston portion 64 is zero, the damping of the device 1 is controlled primarily by the 2-port valve 82. The control may be passive or adaptive as by being proportional to the electrical control signal supplied by the control circuitry 95. The circuitry 95 is arranged to supply to the 3-port valve 49 control signals dependent on the load experienced by the device 1 or the pressure difference across the piston portion 64, and sudden changes in the steady load experienced by the device, due to a change in the payload of the vehicle in which the system is incorporated and/or to inertia loads on accelerating or cornering, are accommodated by the servo valve 80 until such time as the valve 49 responds to the control signals to adjust the volume of pressure fluid in the chamber 46 to alter the offset of the gas spring constituted by this chamber and the hydraulic accumulator 51.

Figure 3:
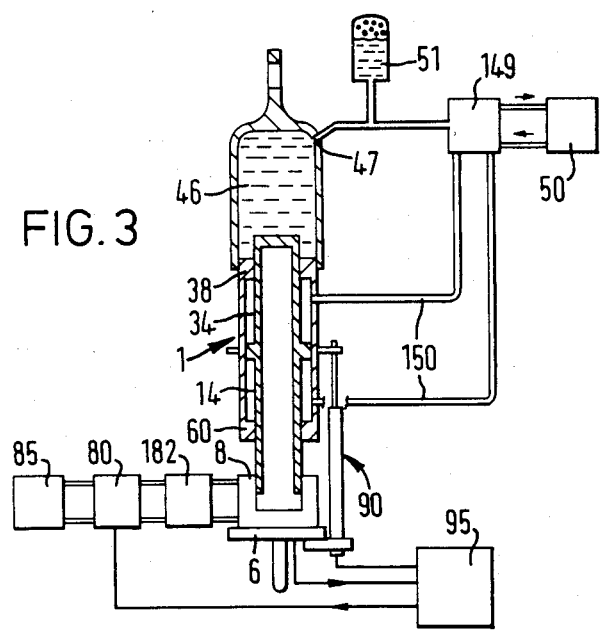
FIG. 3 schematically shows the suspension device of FIG. 1 incorporated in a second vehicle wheel suspension system in accordance with the invention.

In the second system of the invention shown in FIG. 3, parts similar to those of the system shown in FIG. 2 are indicated by the same reference numerals. The second system differs from the first in respect of two modifications, either of which could be made to the first system independently.

Firstly, the electrically controlled 3-port valve 49 is replaced by a 3-port valve 149 controlled hydraulically in response to the pressure difference across the piston portion 64, conveyed to the valve through pipe connections 150.

Secondly, the 2-port electrically controlled valve 82 is placed by an asymmetrical flow restrictive valve 182 fitted with blow off valves (not shown), which could instead be incorporated into the piston portion 64 itself. The characteristics of this valving arrangement are similar to those of damping valves in a shock absorber.

The second system is arranged to respond to steady and changing load conditions in substantially the same way as the first system.

In these and other systems in accordance with the invention, if it is desired to obtain damping characteristics requiring an energy input to the system, the control circuitry 95 is arranged to supply to the servo-valve 80 a signal to effect acceleration or deceleration, as required, of the actuator operation.

Although primarily intended for use in road vehicles, the applications of suspension systems embodying the invention are not so limited.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. In a vehicle suspension system:
   a wheel suspension device, said wheel suspension device comprising a double-acting hydraulic actuator, said hydraulic actuator having a piston movable therein, and gas spring means in parallel with said hydraulic actuator, said gas spring means being controllable to provide a selectively variable offset,
   a hydraulic fluid pressure source,
   a pressure fluid line communicating said hydraulic actuator with said hydraulic fluid pressure source,
   valve means in said pressure fluid line,
   sensor means providing an output in response to the sensing thereby at a load change experienced by said suspension device, and
   control means responsive to said sensor means output to supply a control signal to said valve means to thereby effect adjustment of said hydraulic actuator before change of said offset of said gas spring means, to accommodate said load change.

2. The suspension system of claim 1 wherein said valve means comprises a servo-valve responsive to said signals in series with a two-part proportional valve responsive to said signals.

3. The suspension system of claim 1 wherein said valve means comprises a servo-valve responsive to said signals in series with an asymmetrical flow resisting valve.

4. The suspension system of claim 3 wherein said asymmetrical flow restricting valve has blow-off valve means associated therewith.

5. The suspension system of claim 3 wherein said hydraulic actuator piston has said blow-out valve means included therein.

6. The suspension system of claim 1 wherein said gas spring means comprises a body of gas, a body of fluid on contact with said body of gas and means for adjustment of the volume of said fluid body to thereby control said selectively variable offset of said gas spring means.

7. The suspension system of claim 6 wherein said adjustment means comprises a source of pressure fluid, a pressure fluid line communicating said pressure fluid source with said fluid body, and valve means in said pressure fluid line.

8. The suspension system of claim 7 wherein said valve means comprises a three-port valve responsive to electric signals.

9. The suspension system of claim 7 wherein said valve means comprises a three-port valve responsive to hydraulic signals.

10. The suspension system of claim 9 wherein said hydraulic signals represent pressure differences at the opposed sides of said hydraulic actuator piston.

11. The suspension system of claim 1 wherein said sensor means comprises load cell means responsive to the loading of said suspension device.

12. The suspension system of claim 1 wherein said sensor means comprises a linear variable displacement transformer responsive to the length of said suspension device.

13. The suspension system of claim wherein said sensor means comprises means for sensing a difference between the pressures on the two sides of said hydraulic actuator piston.

14. The suspension system of claim 1 wherein said pressure difference sensing means comprises electrical pressure difference sensing means.

15. The suspension system of claim 1 wherein said pressure difference sensing means comprises hydraulic pressure difference sensing means.

16. A vehicle suspension system comprising:
a wheel suspension device having a double-acting hydraulic actuator, a variable offset gas spring, said gas spring being operable in parallel with said hydraulic actuator, electrically responsive first valve means controlling the length of said actuator, hydraulically responsive second valve means controlling the offset of said gas spring, and
control means responsive to the loading of said wheel suspension device to adjust said wheel suspension device by adjustment of said actuator before adjustment of said gas spring, said control means comprising electrical sensor means adapted to supply electrical control signals to said first valve means, and hydraulic sensor means adapted to supply hydraulic control signals to said second valve means.

17. The suspension system of claim 16 wherein said control means comprises first and second electrically adjustable valve means for operating said hydraulic actuator and said gas spring respectively,
sensor means adapted to generate electrical signals in response to said loading, and
circuit means connected to said sensor means to receive said electric signals and adapted to provide control signals for said first and second valve means.

18. A vehicle suspension system comprising:
a wheel suspension device comprising a doubleacting hydraulic actuator,
a variable offset gas spring in parallel with said hydraulic actuator,
first electrically controllable valve means operable to adjust the length of said hydraulic actuator,
second electrically controllable valve means operable to vary the offset of said gas spring,
control means responsive to load changes experienced by said suspension device to generate correctional electric signals for operating said first and second valve means,
said valve means and said control means being so adapted that adjustment of said actuator occurs before variation of said offset.

19. The suspension system of claim 18 wherein said control means comprises sensing means for sensing said load changes in terms of changes in piston position in said hydraulic actuator.

* * * * *